(12) United States Patent
Martin et al.

(10) Patent No.: US 11,969,869 B1
(45) Date of Patent: Apr. 30, 2024

(54) RIGHT-ANGLE DRILL ADAPTER

(71) Applicants: Andrew P. Martin, Nineveh, IN (US);
Gary R. Martin, Indianapolis, IN (US)

(72) Inventors: Andrew P. Martin, Nineveh, IN (US);
Gary R. Martin, Indianapolis, IN (US)

( * ) Notice: Subject to any disclaimer, the term of this patent is extended or adjusted under 35 U.S.C. 154(b) by 0 days.

(21) Appl. No.: 17/467,591

(22) Filed: Sep. 7, 2021

(51) Int. Cl.
*B25F 3/00* (2006.01)
*B23B 45/00* (2006.01)
*B25B 23/00* (2006.01)

(52) U.S. Cl.
CPC .............. *B25F 3/00* (2013.01); *B23B 45/003* (2013.01); *B25B 23/0028* (2013.01)

(58) Field of Classification Search
CPC ..... B25F 3/00; B25B 45/003; B25B 23/0028; F16C 33/30; F16C 33/38
See application file for complete search history.

(56) References Cited

U.S. PATENT DOCUMENTS

| | | | |
|---|---|---|---|
| 3,714,852 A * | 2/1973 | Giangrasso | B25B 17/00 81/57.3 |
| 4,552,232 A | 11/1985 | Frear | |
| 4,656,894 A * | 4/1987 | Goetz | B25B 13/00 81/58.1 |
| 4,970,918 A | 11/1990 | Brewer et al. | |
| 5,028,181 A | 7/1991 | Jenkins et al. | |
| 5,072,633 A * | 12/1991 | Smith | B25B 13/481 81/57.3 |
| 5,129,823 A * | 7/1992 | Hughes | B23Q 5/046 433/141 |
| 5,345,845 A | 9/1994 | Myers | |
| 5,540,122 A * | 7/1996 | Lund | B25B 13/481 81/57.3 |
| 6,453,778 B1 | 9/2002 | Long | |
| 6,832,531 B1* | 12/2004 | Marquardt | B25B 21/002 81/57.3 |
| 7,290,464 B1 | 11/2007 | Walter | |
| 7,484,438 B2 | 2/2009 | Murphy | |
| 8,065,936 B2 | 11/2011 | Tutino | |
| 9,102,047 B2 | 8/2015 | Park | |
| 9,314,852 B2 | 4/2016 | Santamarina et al. | |
| 2010/0054649 A1* | 3/2010 | Yamada | F16C 33/62 420/64 |

* cited by examiner

*Primary Examiner* — Michelle Lopez
(74) *Attorney, Agent, or Firm* — Cramer Patent & Design PLLC; Aaron R. Cramer

(57) ABSTRACT

A drill adapter is fashioned to enable right-angle drilling, incorporating an input drive, an input bearing, an output bearing, and an output drive. The input drive is capable of receiving a hand-held driving tool and the output drive is capable of engaging a fastener. The input bearing, which is driven by the input drive, is operably attached to the output bearing, which drives the output drive. The adapter incorporates a housing to protect the bearings and also has a handle to enable an operator to grasp.

16 Claims, 5 Drawing Sheets

RIGHT-ANGLE DRILL ADAPTER

RELATED APPLICATIONS

Non-applicable.

FIELD OF THE INVENTION

The present invention relates generally to a drill adapter and specifically to a right-angle drill adapter.

BACKGROUND OF THE INVENTION

General construction projects require a wide variety of power tools to accomplish the job properly. A power tool that has proven itself worthy of inclusion in any toolbox is the power drill. The ability for the drill to produce a hole in just about any material makes it very valuable indeed. It is used in all stages of construction from initial framing to finish carpentry.

However, there are many instances where drilling a hole in a confined or angled location is necessary. Such locations do not allow for both the drill bit and the drill body to be present. While right angle drills help somewhat in this regard, they are somewhat limited in size and can only be used with light duty (low horsepower) drills. Should higher horsepower drills be utilized, the right-angle adapter can be destroyed.

Additionally, the overall offset or distance between the input and output shafts can be somewhat limited. Accordingly, there exists a need for a means by which a heavy duty industrial drill can be adapted to drill a hole in a confined location at a large offset distance. The development of the Right-Angle Drill Adapter fulfills this need.

SUMMARY OF THE INVENTION

To achieve the above and other objectives, the present invention provides for an offset drill adapter, comprising, a main body having a middle portion, a proximal end, and a distal end, an input shaft disposed on the proximal end of the main body, an output shaft disposed on the distal end of the main body, a plurality of bearing support fasteners disposed around the input shaft, a plurality of roller support fasteners disposed on the middle portion of the main body, a handle support shaft disposed near the proximal end of the main body, a light switch disposed on the main body, a pair of batteries wired in parallel and then a series connection is made to the light switch and a light-emitting diode to provide activation to the light switch, and a set of 2 metal wear plates surrounding a bearing raceway on each side of the second sprocket for a total of 4 wear plates, 2 bearing raceways, and 28 ball bearings.

The handle support shaft is adjustable along a handle support location area. The bearing support fasteners include a first roller and a first screw. The main body may include a hexagonal section to allow use with a standard chuck. The main body may include the hexagonal section to allow use with a quick release mechanism. The quick-release chuck may accept a drill bit with the hexagonal section. An input rotational travel path on the input shaft may produce an output rotational travel path on the output shaft. The input rotational travel path and the output rotational travel path may be bidirectional which may allow for both forward and reverse movement. The output shaft may include a quick-release chuck disposed on the distal end of the main body. The quick-release chuck may reduce the need for a standard Jacobs chuck and may reduce an overall clearance length when drilling a hole. The quick-release chuck may be surrounded by 14 ball bearings of the 28 ball bearings.

The outer portion of the 14 ball bearings may be bordered with a first metal ring welded to a first sprocket that may drive a chain which may connect to a second sprocket at the distal end of the main body. The first sprocket may be connected to a second metal ring surrounding a set of 8 ball bearings of the 28 ball bearings. A drill may be attached to the input shaft. The drill may be selected from the group consisting of a straight conventional drill, a hand-operated drill, or a battery-operated drill. The bearing support fasteners may include 4 bearing support fasteners. The bearing support fasteners may be arranged at 90 degree intervals. The roller support fasteners may include 4 roller support fasteners. The handle support shaft may provide an attachment point for a rotating handle clamp which may move along a 360° travel path. An ergonomic hand grip mechanically attached to the rotating handle clamp may serve as a grasp point when using the offset drill adapter. The ergonomic hand grip may allow for additional leverage when drilling through material. The light switch may control the light-emitting diode which produces a plurality of light rays that may illuminate a drilling area.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
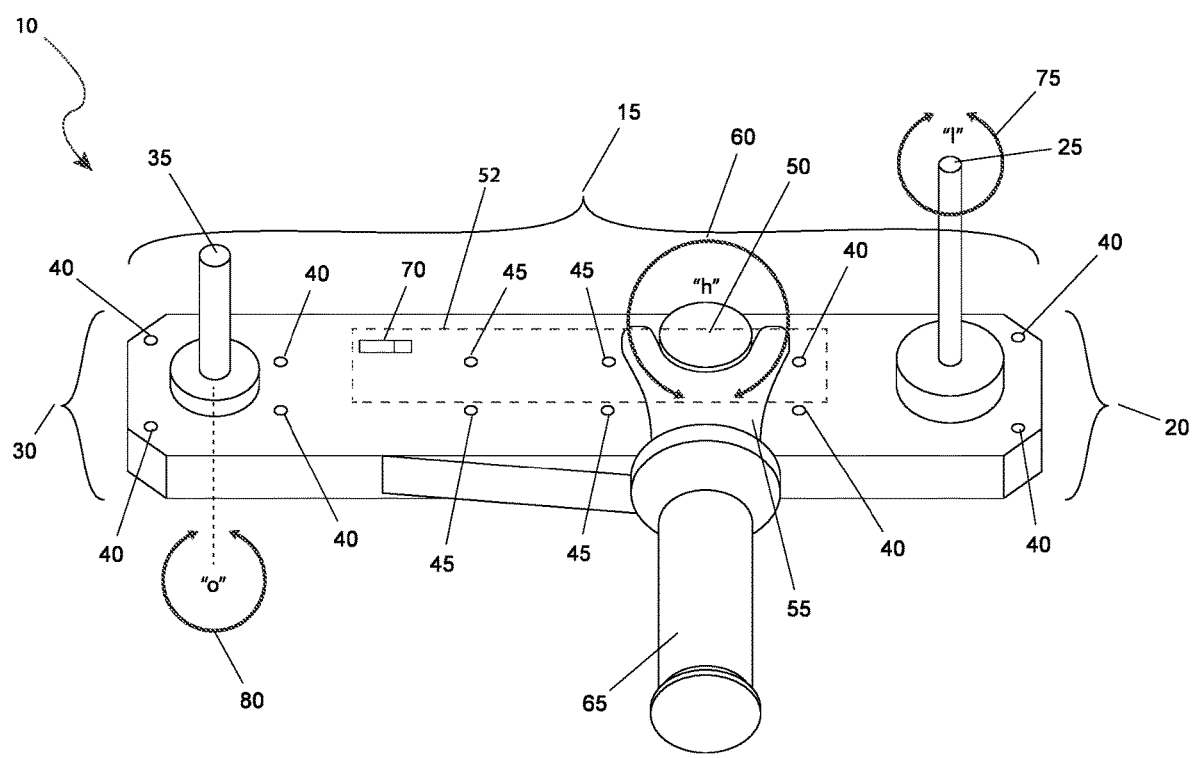
FIG. 1 is a perspective view of a top of an offset drill adapter, according to the preferred embodiment of the present invention.

DESCRIPTIVE KEY 10 offset drill adapter
15 main body
20 proximal end
25 input shaft
30 distal end
35 output shaft
40 bearing support fastener
45 roller support fastener
50 handle support shaft
52 handle support location area
55 rotating handle clamp
60 travel path "h"
65 ergonomic hand grip
70 light switch
75 input rotational travel path "i"
80 output rotational travel path "o"
85 hexagonal section
90 quick-release chuck 95 drill bit
100 overall clearance length "l"
105 light-emitting diode (LED)
110 light rays
115 force "a"
120 electric drill
125 drill handle
130 drill trigger
135 material to be drilled
140 access area "b"
145 first roller
150 first screw
155 ball bearing
160 first metal ring
165 first sprocket
170 chain
175 second sprocket
180 second metal ring
185 second roller
190 second screw
195 battery
200 wear plates
205 bearing raceway

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the top of the offset drill adapter 10, according to the preferred embodiment of the present invention is disclosed. The offset drill adapter (herein also described as the "adapter") 10, is an offset drill adapter for heavy-duty industrial use. A main body 15 comprises the majority of the invention. A proximal end 20 is provided with an input shaft 25 while a distal end 30 is provided with an output shaft 35. The overall size of the adapter 10 can vary dependent on mode, type and application, however, a typical size would be approximately seventeen and one-quarter inches (17¼ in.) long, three and one-half inches (3½ in.) wide, and one and one-half inches (1½ in.) inches deep.

Four (4) bearing support fasteners 40 are provide around the input shaft 25, arranged at ninety-degree (90°) intervals. Another four (4) bearing support fasteners 40 are provided around the output shaft 35, also arranged at ninety-degree (90°) intervals. The bearing support fasteners 40 will be described in greater detail below. A total of four (4) roller support fasteners 45 are provided at the middle of the main body 15. Both the bearing support fasteners 40 and the roller support fasteners 45 will be described in greater detail herein below. A handle support shaft 50 is provided near the proximal end 20. The location of the handle support shaft is user adjustable along a handle support location area 52. The handle support shaft 50 provides an attachment point for a rotating handle clamp 55 which moves along a three hundred sixty-degree (360°) travel path "h" 60. An ergonomic hand grip 65 is then mechanically attached to the rotating handle clamp 55 which serves as a grasp point for the user when using the adapter 10. The ergonomic hand grip 65 allows for the application of additional leverage when drilling through material. The handle support location area 52 allows for proper leverage depending the specific application of the adapter 10. A light switch 70 is located on the exterior of the main body 15 and will be described in greater detail hereinbelow. Finally, an input rotational travel path "i" 75 on the input shaft 25 produces an output rotational travel path "o" 80 on the output shaft 35. It is noted that both the input rotational travel path "i" 75 and the output rotational travel path "o" 80 are bidirectional which allows for both forward and reverse movement.

Figure 2:
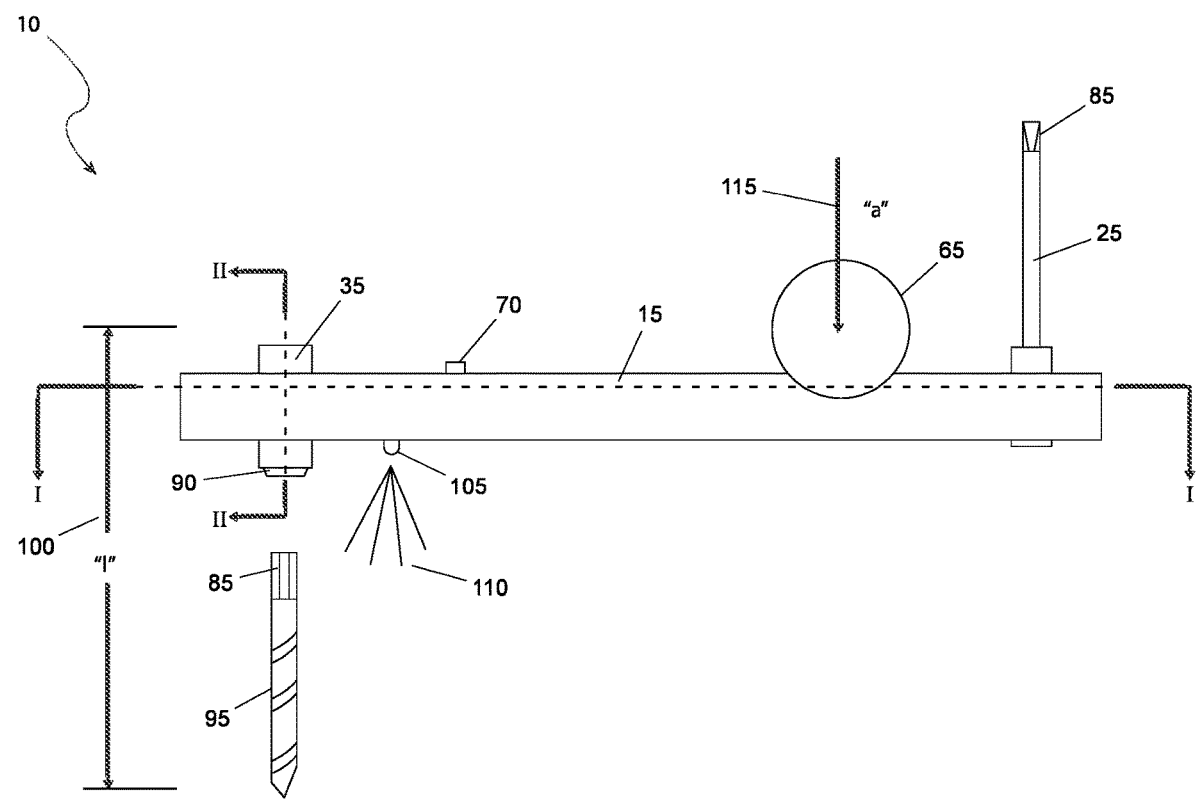
FIG. 2 is a side view of the offset drill adapter, according to the preferred embodiment of the present invention.

Referring next to FIG. 2, a side view of the adapter 10, according to the preferred embodiment of the present invention is depicted. This view discloses the perpendicular arrangement of the input shaft 25 to the main body 15. The main body 15 is envisioned to be provided with a hexagonal section 85 to allow use in both standard chucks as well as quick release mechanisms. The output shaft 35 is provided with a quick-release chuck 90 on the opposite end. The quick-release chuck 90 is capable of accepting drill bit 95 with a hexagonal section 85. The coupling reduces the need for a standard Jacobs chuck and thus reduces the overall clearance length "l" 100 when drilling a hole. The light switch 70 controls the activation of a light-emitting diode (LED) 105 which produces light rays 110 that illuminate the drilling area. As a force "a" 115 is applied to the ergonomic hand grip 65, drilling is facilitated.

Figure 3:
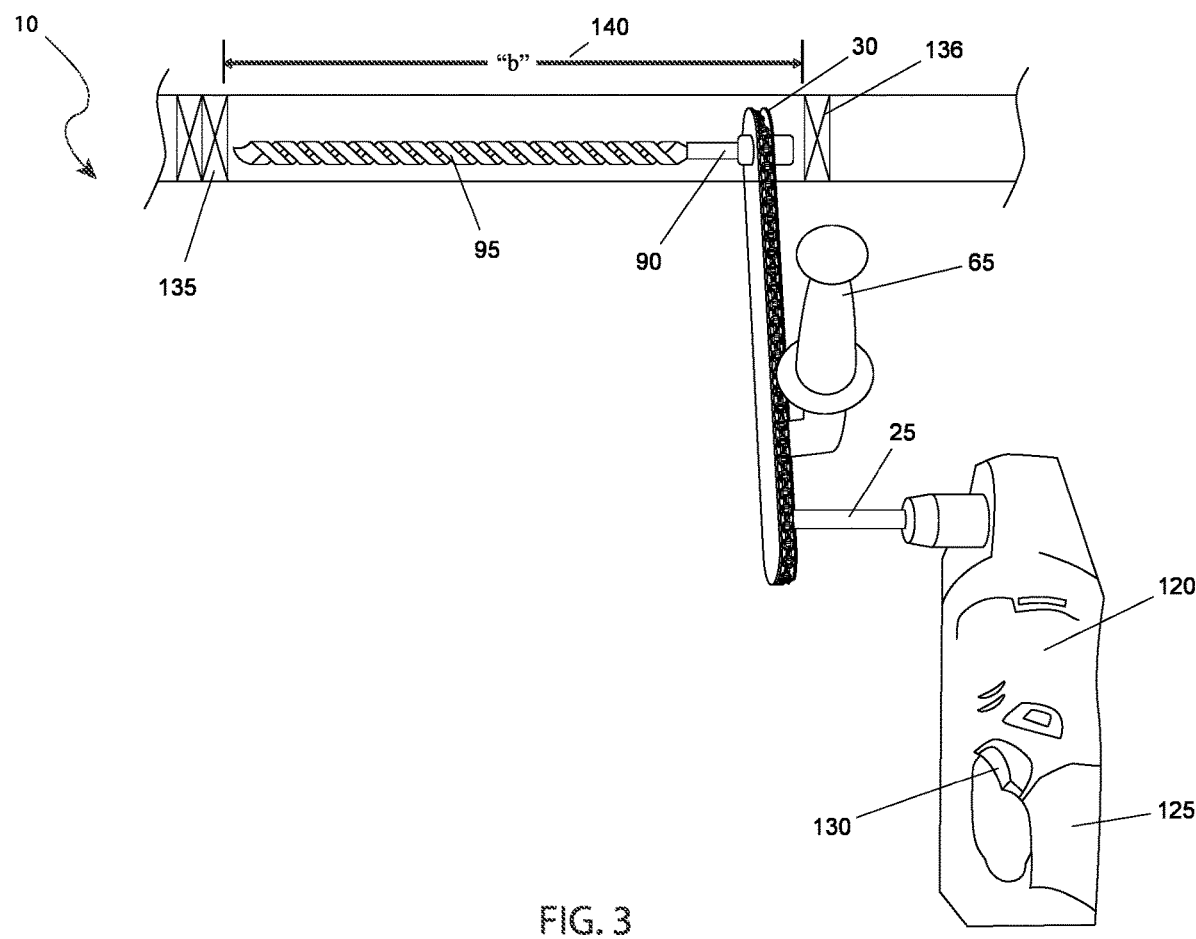
FIG. 3 is a perspective view of the offset drill adapter shown in a utilized state, according to the preferred embodiment of the present invention.

Referring now to FIG. 3, a perspective view of the adapter 10 shown in a utilized state, according to the preferred embodiment of the present invention is shown. An electric drill 120 is attached to the input shaft 25. The electric drill 120 is shown as a right-angle drill for purposes of illustration. However, other types of electric drills 120 such as straight conventional drills, hand-operated drills, battery-operated drills, or combination thereof. The user would place one (1) hand on the drill handle 125 whereupon the same hand activates the drill trigger 130. The other hand of the user holds the ergonomic hand grip 65. The drill bit 95 is fastened into the quick-release chuck 90, whereupon it is positioned in between material to be drilled 135 such as wood studs (as shown), concrete, steel, or the like. As shown, the access area "b" 140 needed for the drill bit 95 and the distal end 30 would be less than needed for the drill bit 95 and reduced arrangement of the right-angle electric drill 120 as shown.

Figure 4:
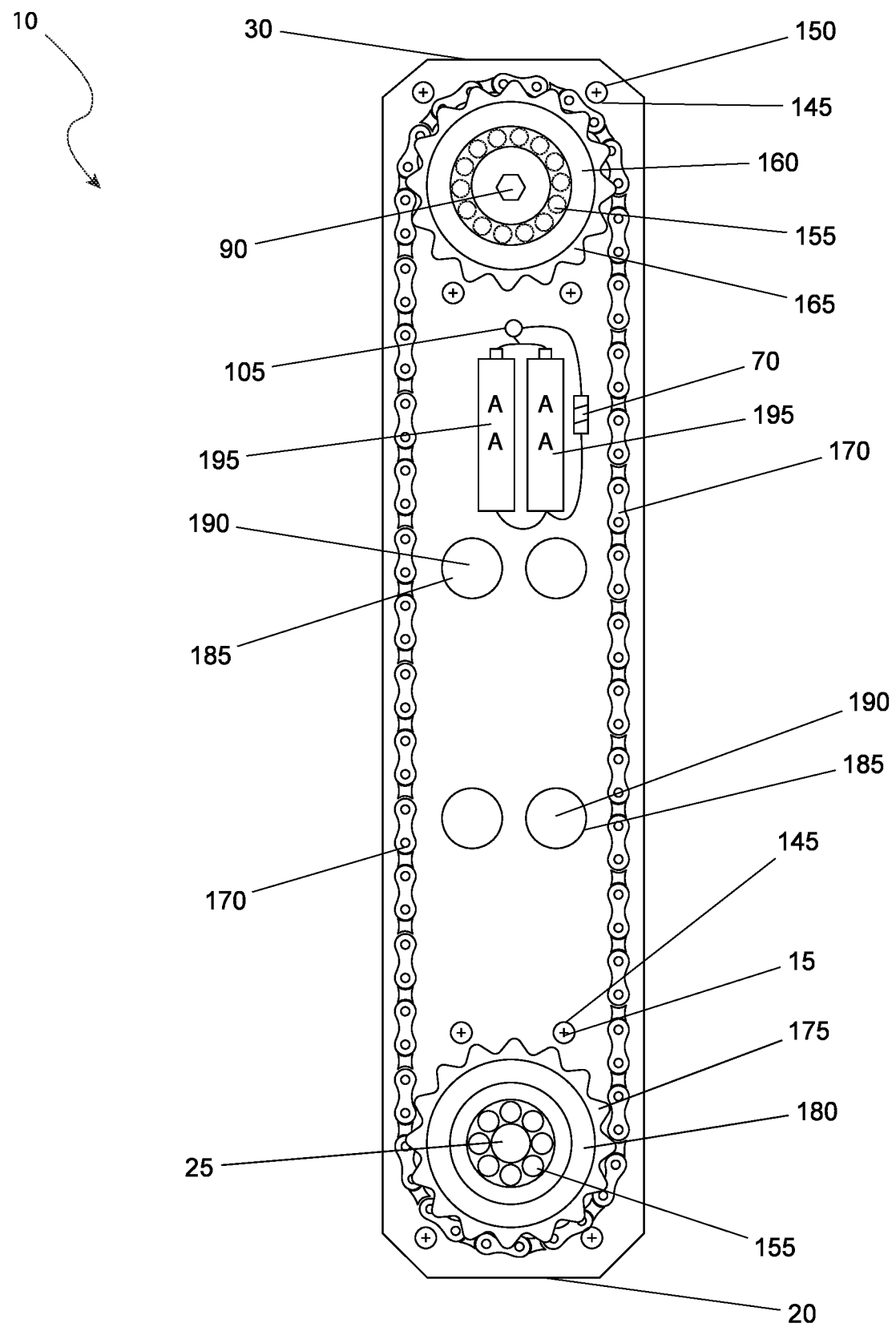
FIG. 4 is a sectional view of the offset drill adapter, as seen along a Line I-I, as shown in FIG. 2, according to the preferred embodiment of the present invention.

Referring next to FIG. 4, a sectional view of the adapter 10, as seen along a Line I-I, as shown in FIG. 2, according to the preferred embodiment of the present invention is disclosed. The bearing support fasteners 40 are comprised of a first roller 145, envisioned to be one-quarter inch (¼ in.) by three-quarter inch (¾ in.) size and a first screw 150 envisioned to be 8-32 in size. The quick-release chuck 90 is surrounded by fourteen (14) ball bearings 155 envisioned to be made of stainless steel with the approximate outer dimension of five-sixteenths of an inch (5/16 in.). The outer portion of the ball bearings 155 are bordered with a first metal ring 160 envisioned to be two and one-quarter inches (2¼ in.) in diameter and one-eighth of an inch (⅛ in.) of an inch thick. The first metal ring 160 is welded to a first sprocket 165, envisioned to be three inches (3 in.) in diameter. The first sprocket 165 drives a chain 170 which connects to a second sprocket 175 at the distal end 30. The second sprocket 175 is the same size as the first sprocket 165. Similarly, the first sprocket 165 is connected to a second metal ring 180 surrounding a set of eight (8) ball bearings 155.

The interior section of the ball bearings 155 holds the input shaft 25 envisioned to be three-eights of an inch (¾ in.) in diameter and four and a half inches (4½ in.) in length. The roller support fasteners 45 are comprised of a second roller 185 envisioned to be made of nylon and approximately three-quarters of an inch (¾ in.) in diameter and three-quarters of an inch (¾ in.) in height, and a second screw 190 envisioned to be an 8-32 screw. Two (2) batteries 195 are wired in parallel and then a series connection is made to the light switch 70 and the light-emitting diode (LED) 105 to provide activation.

Figure 5:
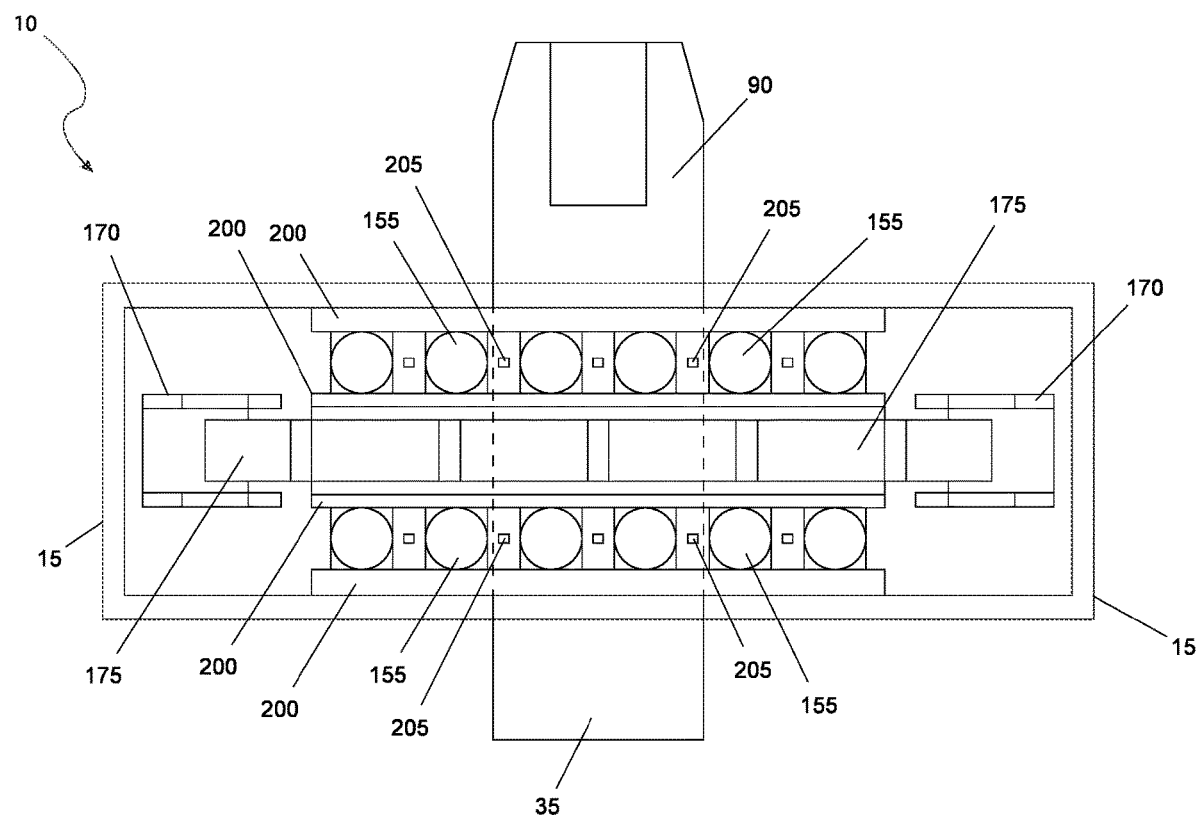
FIG. 5 is a sectional view of the offset drill adapter, as seen along a Line II-II, as shown in FIG. 2, according to the preferred embodiment of the present invention.

Referring to FIG. 5, a sectional view of the adapter 10, as seen along a Line II-II, as shown in FIG. 2, according to the preferred embodiment of the present invention is depicted. As aforementioned described, the main body 15 provides the outer enclosure for the adapter 10. The output shaft 35 and the quick-release chuck 90 sharing a common body, are centrally positioned in the main body 15. A set of two (2) metal wear plates 200 surround a bearing raceway 205 on each side of the second sprocket 175 for a total of four (4) wear plates 200, a total of two (2) bearing raceways, ad a total of twenty-eight (28) ball bearings. It is noted that the configuration as depicted in FIG. 5 represents the distal end 30 of the adapter 10. It is also noted that the proximal end of the adapter 10 is similar in configuration, however, a lesser amount of ball bearings 166 (two (2) sets of eight (8) each for a total of sixteen (16)).

2. Operation of the Preferred Embodiment

The preferred embodiment of the present invention can be utilized by the common user in a simple and effortless manner with little or no training. It is envisioned that the adapter 10 would be constructed in general accordance with FIG. 1 through FIG. 5. The user would procure the adapter 10 from conventional procurement channels such as hardware stores, home improvement stores, mechanical supply houses, mail order and internet supply houses and the like. Special attention would be paid to the overall length of the adapter 10 such that it is appropriate for the intended use.

After procurement and prior to utilization, the adapter 10 would be prepared in the following manner: the drill bit 95 would be positioned in the quick-release chuck 90, the electric drill 120 would be attached to the input shaft 25, and the ergonomic hand grip 65 would be positioned along the travel path "h" 60 to a position that allows for the application of force "a" 115. At this point in time, the adapter 10 is ready for use.

During utilization of the adapter 10, the following procedure would be initiated: the drill bit 95 would be positioned at the point where the hole in the material to be drilled 135 would be located; with one (1) hand on the ergonomic hand grip 65 and the other the drill handle 125, the drill trigger 130 would be activated; the user would apply force "a" 115 to the ergonomic hand grip 65 until the hole is completely drilled.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An offset drill adapter, comprising:
a main body having a middle portion, a proximal end, and a distal end;
an input shaft disposed on the proximal end of the main body;
an output shaft disposed on the distal end of the main body;
a plurality of bearing support fasteners disposed around the input shaft, the bearing support fasteners include a first roller and a first screw;
a plurality of roller support fasteners disposed on the middle portion of the main body;
a handle support shaft disposed near the proximal end of the main body, the handle support shaft is adjustable along a handle support location area;
a light switch disposed on the main body;
and a pair of batteries wired in parallel and then a series connection is made to the light switch and a light-emitting diode to provide activation to the light switch;
wherein the output shaft includes a quick-release chuck disposed on the distal end of the main body;
wherein the quick-release chuck is surrounded by a first set of ball bearings;
wherein an outer portion of the first set of ball bearings are bordered with a first metal ring welded to a first sprocket that drives a chain which connects to a second sprocket at the distal end of the main body;
wherein the first sprocket is connected to a second metal ring with the second metal ring surrounding a second set of ball bearings; and
wherein a set of 2 metal wear plates surrounding a bearing raceway on each side of the second sprocket for a total of 4 wear plates, 2 bearing raceways, the first set of ball bearings, and the second set of ball bearings.

2. The offset drill adapter, according to claim 1, wherein the main body includes a hexagonal section to allow use with a standard chuck.

3. The offset drill adapter, according to claim 2, wherein the main body includes the hexagonal section to allow use with a quick release mechanism.

4. The offset drill adapter, according to claim 2, wherein the quick-release chuck accepts a drill bit with the hexagonal section.

5. The offset drill adapter, according to claim 1, wherein an input rotational travel path on the input shaft produces an output rotational travel path on the output shaft.

6. The offset drill adapter, according to claim 5, wherein the input rotational travel path and the output rotational travel path are bidirectional which allows for both forward and reverse movement.

7. The offset drill adapter, according to claim 1, wherein the quick-release chuck reduces a need for a standard Jacobs chuck and reduces an overall clearance length when drilling a hole.

8. The offset drill adapter, according to claim 1, wherein a drill is attached to the input shaft.

9. The offset drill adapter, according to claim 8, wherein the drill is selected from the group consisting of a straight conventional drill, a hand-operated drill, or a battery-operated drill.

10. The offset drill adapter, according to claim 1, wherein the bearing support fasteners include 4 bearing support fasteners.

11. The offset drill adapter, according to claim 1, wherein the bearing support fasteners are arranged at 90 degree intervals.

12. The offset drill adapter, according to claim 1, wherein the roller support fasteners include 4 roller support fasteners.

13. The offset drill adapter, according to claim 1, wherein the handle support shaft provides an attachment point for a rotating handle clamp which moves along a 360 degree travel path.

14. The offset drill adapter, according to claim 1, further comprising an ergonomic hand grip mechanically attached to the rotating handle clamp which serves as a grasp point when using the off set drill adapter.

15. The offset drill adapter, according to claim 14, wherein the ergonomic hand grip allows for additional leverage when drilling through material.

16. The offset drill adapter, according to claim 1, wherein the light switch controls the light-emitting diode which produces a plurality of light rays that illuminate a drilling area.

\* \* \* \* \*